(12) United States Patent
Tognazzini et al.

(10) Patent No.: US 6,532,021 B1
(45) Date of Patent: Mar. 11, 2003

(54) OPAQUE SCREEN VISUALIZER

(75) Inventors: Bruce Tognazzini, Woodside, CA (US); Jakob Nielsen, Atherton, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/673,960

(22) Filed: Jul. 1, 1996

Related U.S. Application Data (63) Continuation-in-part of application No. 08/642,223, filed on Apr. 30, 1996.

(51) Int. Cl.[7] .............................................. G06T 15/00
(52) U.S. Cl. ........................................................ 345/629
(58) Field of Search ................................ 345/435, 419, 345/421, 427, 629, 630, 634

(56) References Cited

U.S. PATENT DOCUMENTS

| | | | | |
|---|---|---|---|---|
| 4,641,255 A | * | 2/1987 | Hohmann | 345/435 |
| 4,970,666 A | | 11/1990 | Welsh et al. | 364/522 |
| 5,479,597 A | * | 12/1995 | Fellous | 345/419 |
| 5,495,576 A | | 2/1996 | Ritchey | 395/125 |
| 5,515,268 A | | 5/1996 | Yoda | 364/401 |
| 5,633,995 A | * | 5/1997 | McClain | 395/119 |
| 5,644,687 A | * | 7/1997 | Agonajer et al. | 395/119 |

FOREIGN PATENT DOCUMENTS

| | | |
|---|---|---|
| FR | 2720523 | 12/1995 |

OTHER PUBLICATIONS

Nadia Magnenat Thalmann et al., "Virtual Actors Living in a Real World", Proceedings Computer Animation, Jan. 1, 1995, pp. 19–29, 210.

Deborah Hix et al., "Pre-screen Projection: From Concept to Testing of a New Interaction Technique", Human Factors in Computing Systems, CHI '95 Conference Proceedings. Denver, May 7–11, 1995, May 7, 1995, pp. 226–233.

* cited by examiner

Primary Examiner—Phu K. Nguyen
(74) Attorney, Agent, or Firm—McDermott, Will & Emery (57) ABSTRACT

Rendered wire frame models of objects offered for sale can be downloaded and displayed as virtual objects in the context of an environment in which a real object would be actually used. The rendered models are located and oriented so that they appear exactly as a real object would appear when placed in the environment. A video camera captures the environment and a two dimensional perspective view of the rendered wire frame model is combined with an image of the environment to show how the object will look when actually installed.

13 Claims, 12 Drawing Sheets

OPAQUE SCREEN VISUALIZER

RELATED APPLICATIONS

This is a continuation in part of copending Application Ser. No. 08/642,223, filed Apr. 30, 1996 which is incorporated herein by reference in its entirety.

BACKGROUND OF THE INVENTION

1. Field of the Invention

The invention relates to computing systems and more particularly to a hand held computer with an opaque display utilized to allow a viewer to see a rendered wire frame model of an object in the context of a video display of surroundings where a real object might be placed.

2. Description of Related Art

Consumers often find that goods they have purchased, once placed in the target environment, prove to be unsatisfactory. For example, although the size and color of a particular object may be described in a traditional printed catalog or available from an on-line catalog over a network such as the Internet's World Wide Web, consumers may be disappointed after purchase, when the object is actually placed in the consumer's home or other target environment.

Computerized two-dimensional images of retail objects are known but provide the consumer with little sense of the object's size or with what degree of success the object would integrate into the destination environment. This is especially true of "custom" items where no corresponding physical sample exists.

Virtual reality systems allow the consumer, while wearing an uncomfortable helmet, to see a three-dimensional stereo representation of an object within an artificial environment, but suffers similar limitations.

A videotape entitled "Starfire" was produced by SunSoft in 1994. It depicted a portable hand held computing device called the SunPad. Using an flat-panel opaque screen, the SunPad displayed images captured by a separate (and remote) camera. The SunPad was used to remotely control the camera, i.e. the camera movements were controlled by the user and the SunPad's display was continually updated so that it became a remote display for the camera's output. The SunPad depicted in the videotape did not allow the consumer to change the context in which objects were viewed.

The Problems

The techniques described above all suffer the same limitation: the inability of the consumer to view a representation of an object within an environment, or context, where it would normally be used. This inability denies consumers significant relevant information which leads, in turn, to bad purchases (e.g. "The microwave oven sticks out over the edge of the counter!") and subsequent returns.

Being able to view the object in context enhances the buying experience for the consumer and reduces costs of returns and exchanges for the seller. The consumers ability to make better buying decisions when interacting with electronic marketing forums such as the World Wide Web will promote widespread acceptance of retail electronic commerce.

SUMMARY OF THE INVENTION

The present invention provides apparatus, systems, processes and computer program products which permits the user, after acquiring a three-dimensional representation of an object, to place, move and rotate that representation of the object (virtual object) within the user's environment. This is accomplished using a hand-held computing device with an opaque flat-panel display and with location sensors, providing the x, y, z, roll, pitch and yaw coordinates of the computing device with respect to a reference coordinate system. In said copending application, to obtain a full three-dimensional stereo view of the object, the three-dimensional representation needed to be viewed through shuttered glasses or through red-blue 3-D viewing glasses. However, in accordance with this invention, the complexity of a full 3D stereo viewing system is avoided while maintaining many of the benefits of the system described in the copending application.

In accordance with the invention, a video camera is placed on the back of a hand held computer display in order to capture a view of the surroundings in which an object to be viewed will be placed. A rendered three dimensional wire frame model of a product which is desired to be viewed in the context of its surroundings is received from a vendor of the product. A position in the three dimensional space of the environment is marked and the wire frame model is rotated and scaled to as to appear to be placed at that position. A two dimensional perspective view of the rendered wire frame model is continuously updated to reflect changes in position and view so that the view of the product and the view of the environment are correct as a user wall walks around in the environment. Since both the 2 dimensional perspective view of the wire frame and the view of the surroundings captured by the video camera are in the same focal plane, there is no need for stereo red/blue glasses or for shuttered glasses.

These novel features of the invention provide users with the ability to see the virtual object in the actual target environment at its real size and shape merely by looking through the transparent pad.

The invention relates to apparatus for displaying a two dimensional view of a three dimensional representation of an object in the context of an environment in which the object might be placed, including a video camera capturing a view of the environment, a computing device with a display, and a device for measuring distance between the computing device and a location in the environment, in which the computing device is configured to display a two dimensional image of the object together with the view of the environment. The device for measuring distance includes at least one telemetry sender, removably attached to the computing device, and at least one telemetry receiver. The computing device is configured to fix the three dimensional representation at the location and to display a two dimensional view of the object and to change the orientation of the three dimensional representation at the location under user control.

The invention is also directed to a method for displaying a two dimensional view of a three dimensional representation of an object, by displaying a two dimensional projection of a three dimensional representation of the object, determining a distance from a display of the computing device to a location at which the object should appear to be located, and adjusting the display of the object to appear to be positioned at the location. A video camera captures the environment in which the object might be placed and displays an image of the environment on the display with the display of the object. The three dimensional representation may be downloaded from another computing device.

The invention also relates to a system for displaying a two dimensional view of a three dimensional representation of an object in the context of an environment in which the object might be placed, including a source of one or more three dimensional representations of objects, and a computing device for displaying a two dimensional view of a three dimensional representation of an object in the context of an environment in which the object might be placed.

The invention also relates to a method for accessing information about items available for acquisition, by retrieving at least one three dimensional representation of one of the items, and displaying at least one two dimensional perspective view of the three dimensional representation on a display together with a view of the environment, whereby the two dimensional perspective view can be viewed in context with an environment in which the one of the items might be used.

The invention is also directed to a system for accessing information about items available for acquisition, including a network, a first storage device containing at least one three dimensional representation of one of the items connected to the network, a computing device connected to the network, configured to download three dimensional representations and to display two dimensional perspective views of them, and a device for measuring distance between a display screen and a location in the environment of the computing device. The computing device displays two dimensional perspective views of the three dimensional representations at the location with a scale determined by the distance between the display screen and the location in the environment.

The invention is also directed to a computer program product including a memory medium, and a computer program stored on the memory medium containing instructions for displaying a three dimensional representation of an object with sizing and orientation appropriate to a location in the environment of a computer upon which the program is to run together with an image of the environment.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
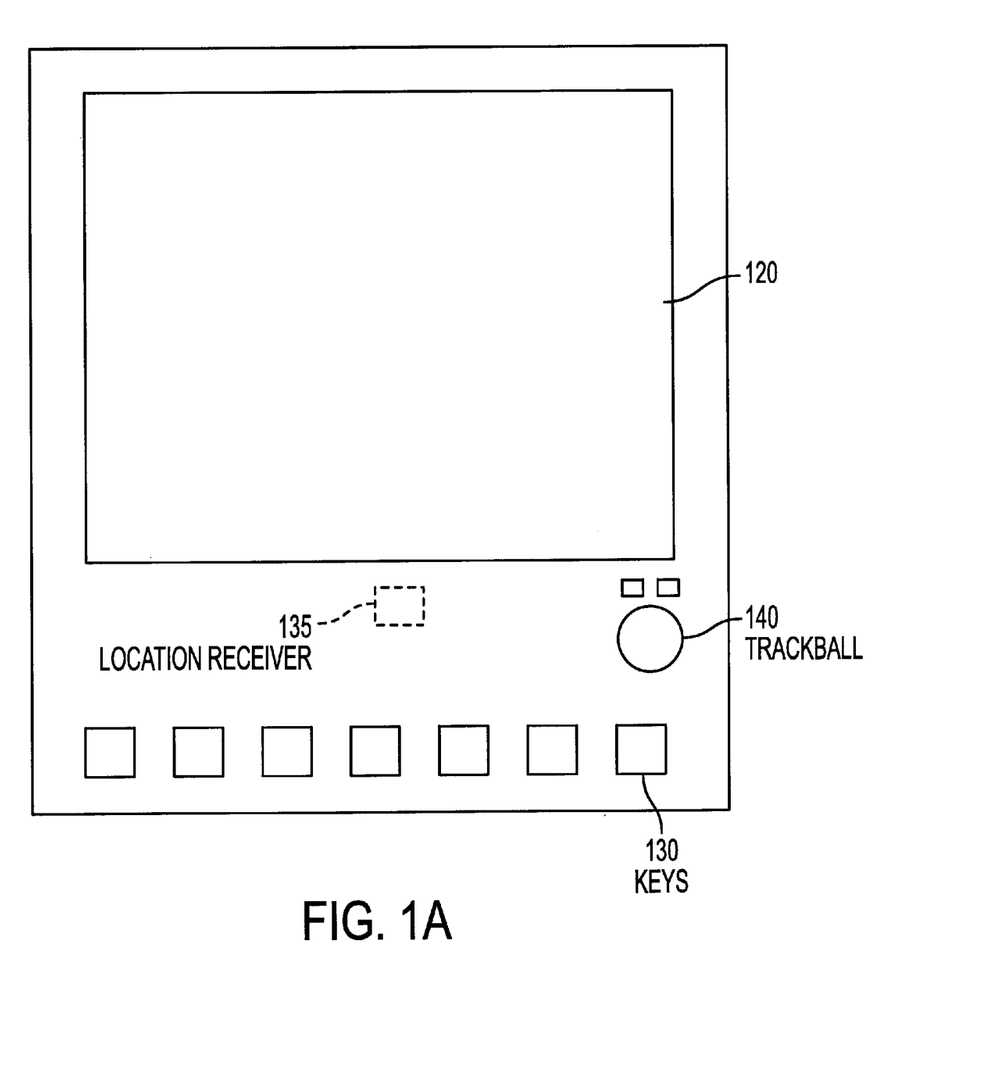
FIG. 1A is a front view of a hand held computing device used in accordance with the invention.

FIG. 1A is a front view of a hand held computing device used in accordance with the invention. The device has a display screen 120, a track ball 140 functioning as a mouse, keys or keyboard 130 and a location receiver 135 shown in hidden lines.

Figure 1B:
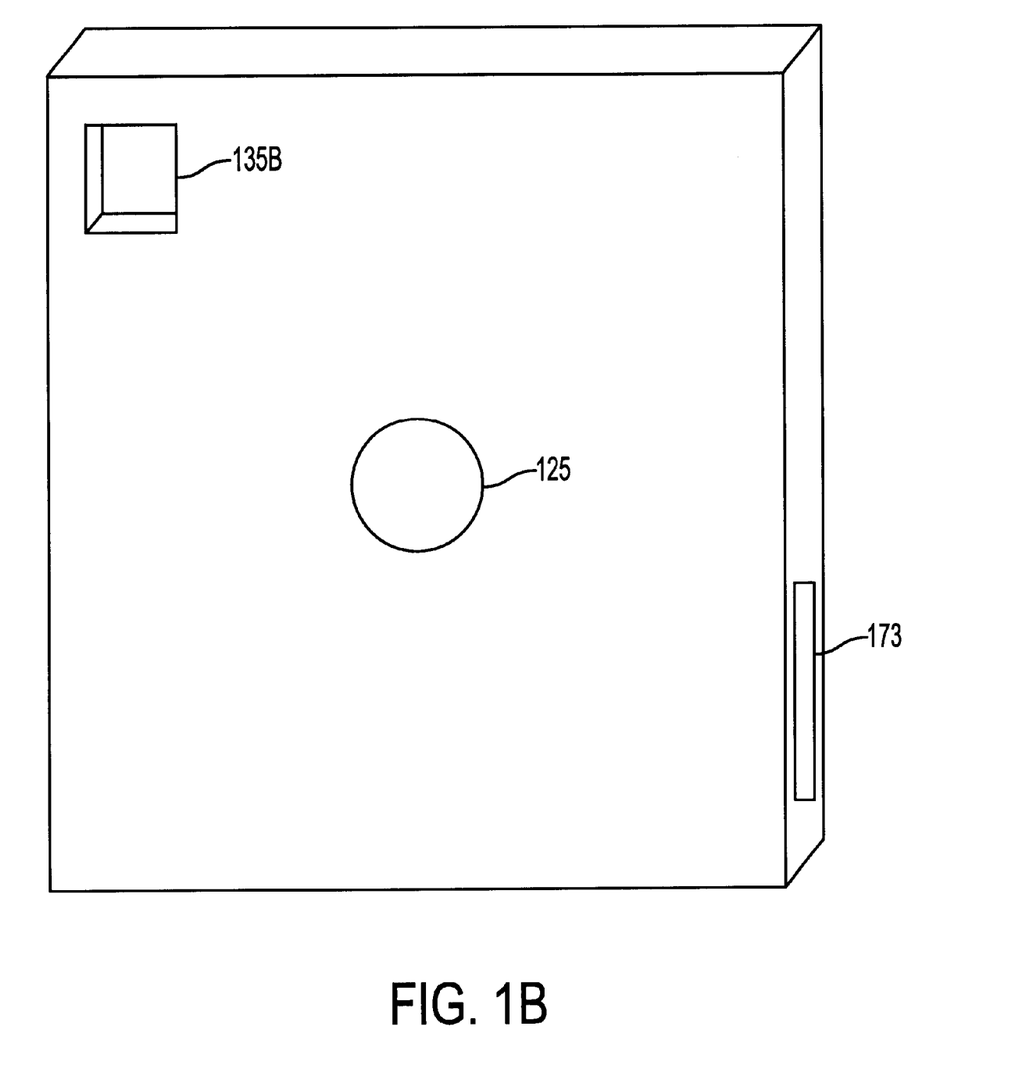
FIG. 1B is a rear perspective view of the hand held computing device of FIG. 1A.

FIG. 1B is a rear perspective view of the hand held computing device of FIG. 1A. As shown in FIG. 1B, a video camera 125 is pointed to view out the rear of the casing of the hand held computing device to capture images from the environment. Disk drive 173 is shown on the side for receiving files and programming information from outside the device.

Figure 1C:
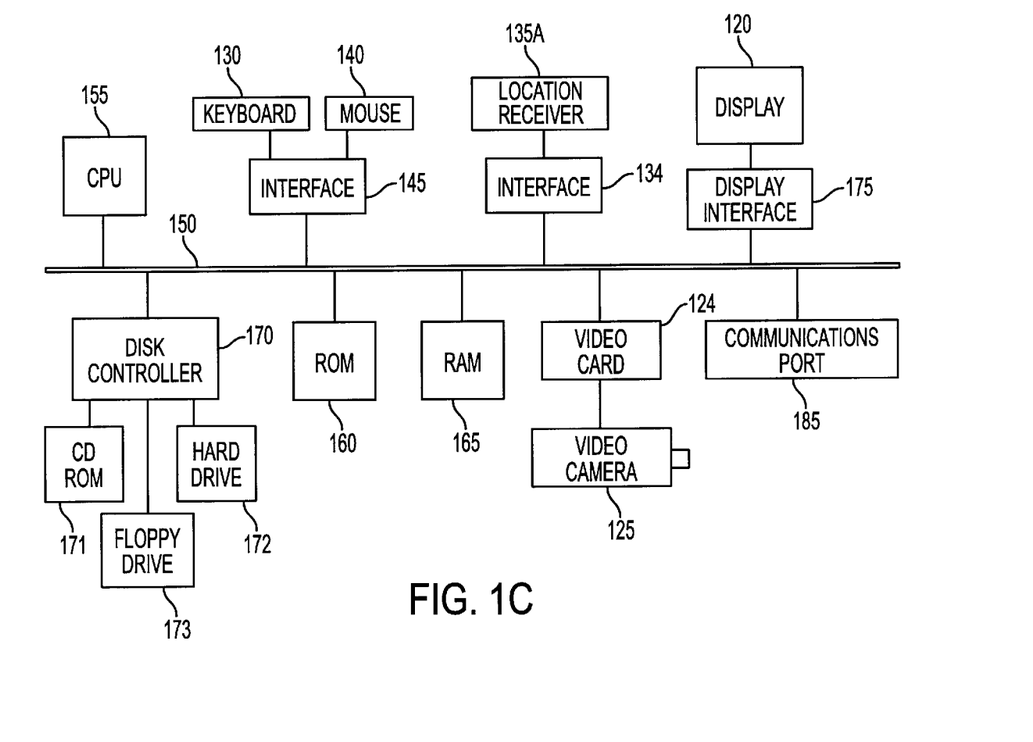
FIG. 1C is a block diagram of a computer of a type suitable for use as a handheld computing device of FIGS. 1A and 1B.

FIG. 1C is a block diagram of a computer of a type suitable for use as a hand held computing device of FIGS. 1A and 1B. A bus 150 serves as the main information highway and for connecting the other components of the computer device. CPU 155 is the central processing unit of the system, performing calculations and logic operations required to execute programs. Read Only Memory (160) and Random Access Memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 119 interfaces a display 120 with the bus and permits information from the bus to be viewed on the display. Communications with external devices can occur over communications port 185. A video camera 125 is connected to the bus over video card 124. This video camera is utilized for capturing images from the environment behind the computing device. A modem 175 prevents access to external networks on a dial up basis and may, alternatively, be a network interface device. A location receiver 135 is connected to the bus over interface 134. The location receiver 135 receives signals from location sender 135B shown removed from its recessed holder at the rear of the computing device as shown in FIG. 1B.

Figure 1D:
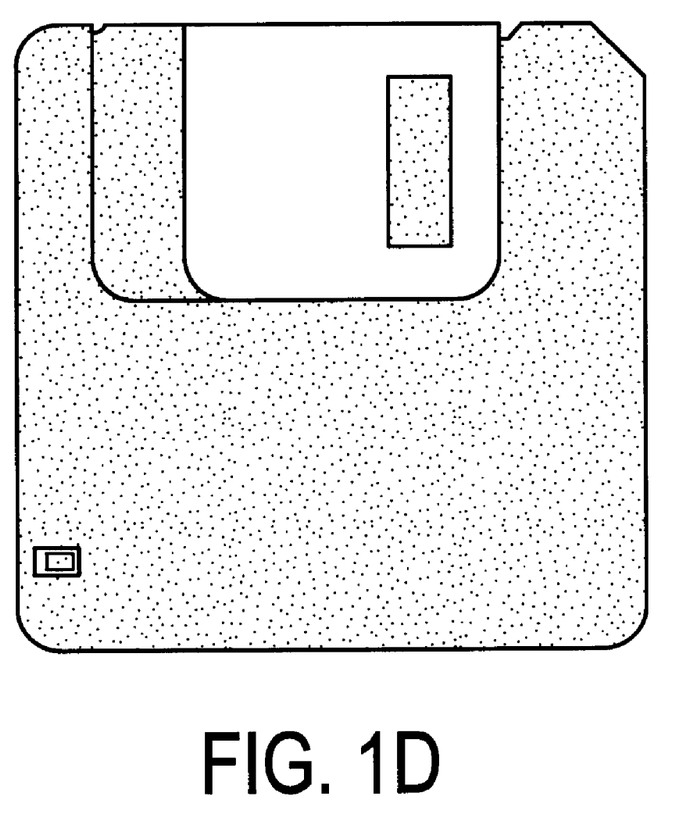
FIG. 1D is an exemplary memory medium used to carry programs and data useful for carrying out the invention.

FIG. 1D is an exemplary memory medium used to carry programs and data useful for carrying out the invention.

The following scenario provides an overview of one use of the invention.

Figure 2:
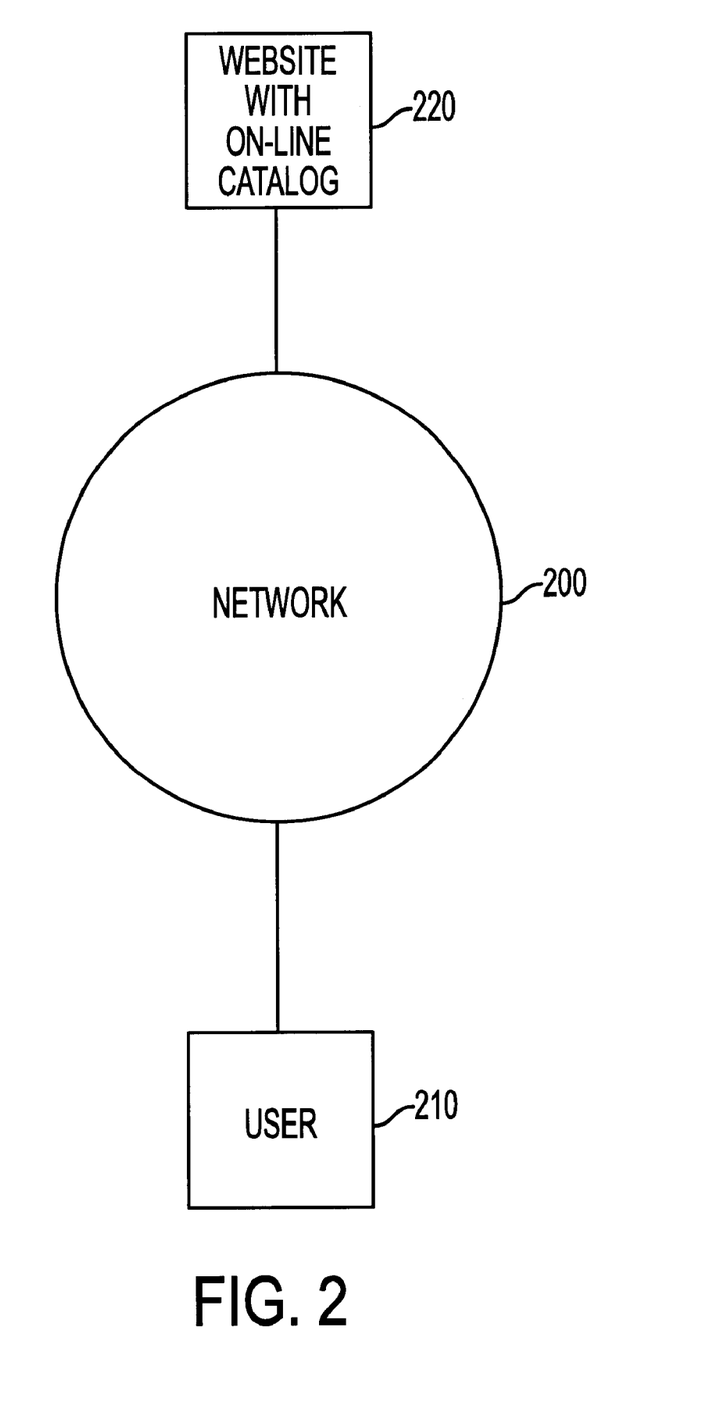
FIG. 2 is an illustration of a user connected over a network to a web site.

A consumer (user 210) browses a network (200) such as the World Wide Web, searching for information about microwave ovens (e.g. FIG. 2). Having found a Web page on a web site 220 that contains information about various models of microwave ovens, the consumer can't decide, based on dimensional and aesthetic information, which model is preferred. So the consumer clicks a button on the Web page to download a three-dimensional surface rendered wire frame model to his hand held computing device. Alternatively, the wire frame model may be given to the consumer on a diskette such as that shown in FIG. 1D. The device has an opaque display screen upon which the wire frame model is displayed. After adjusting position and orientation, the consumer holds up the transparent pad so a video camera can capture a view of the environment in which the oven will be placed. The user sees two-dimensional image of the microwave sitting at the location he has specified and also the area surrounding where the microwave will be located when it is installed.

The consumer may then move the image, change its orientation, and move around it to gain an appreciation for different perspective views of the microwave in its target environment. The consumer can then either order the microwave or look at other models as needed.

Figure 3:
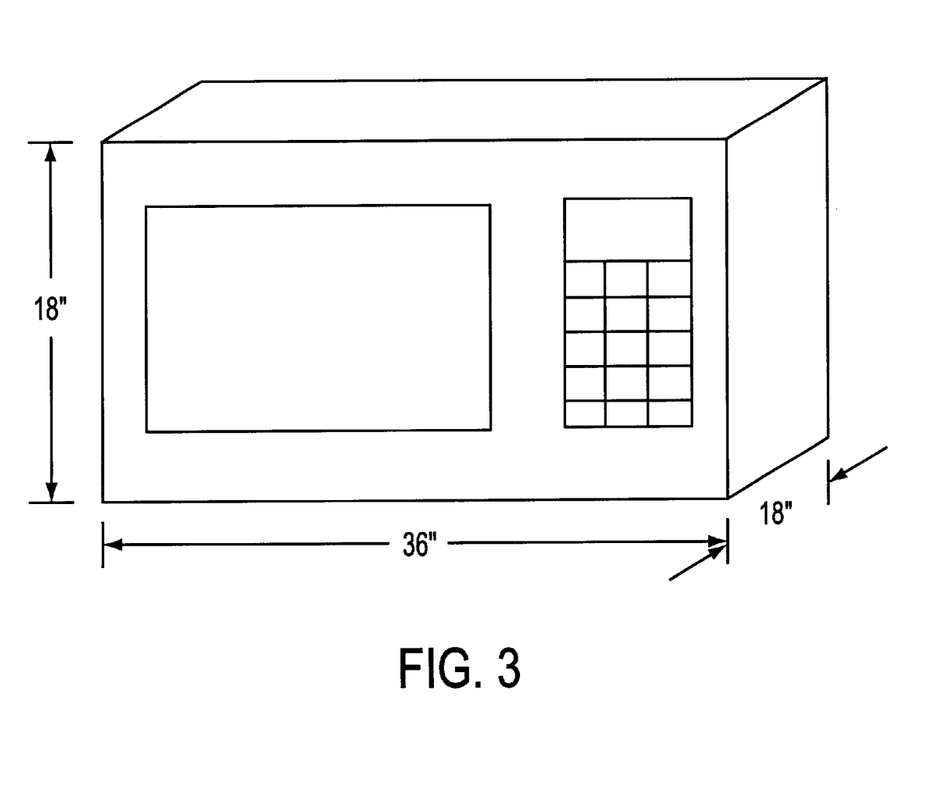
FIG. 3 is an illustration of a microwave oven.

FIG. 3 is an illustration showing the dimensions of the microwave oven used in the example in the specification.

Figure 4:
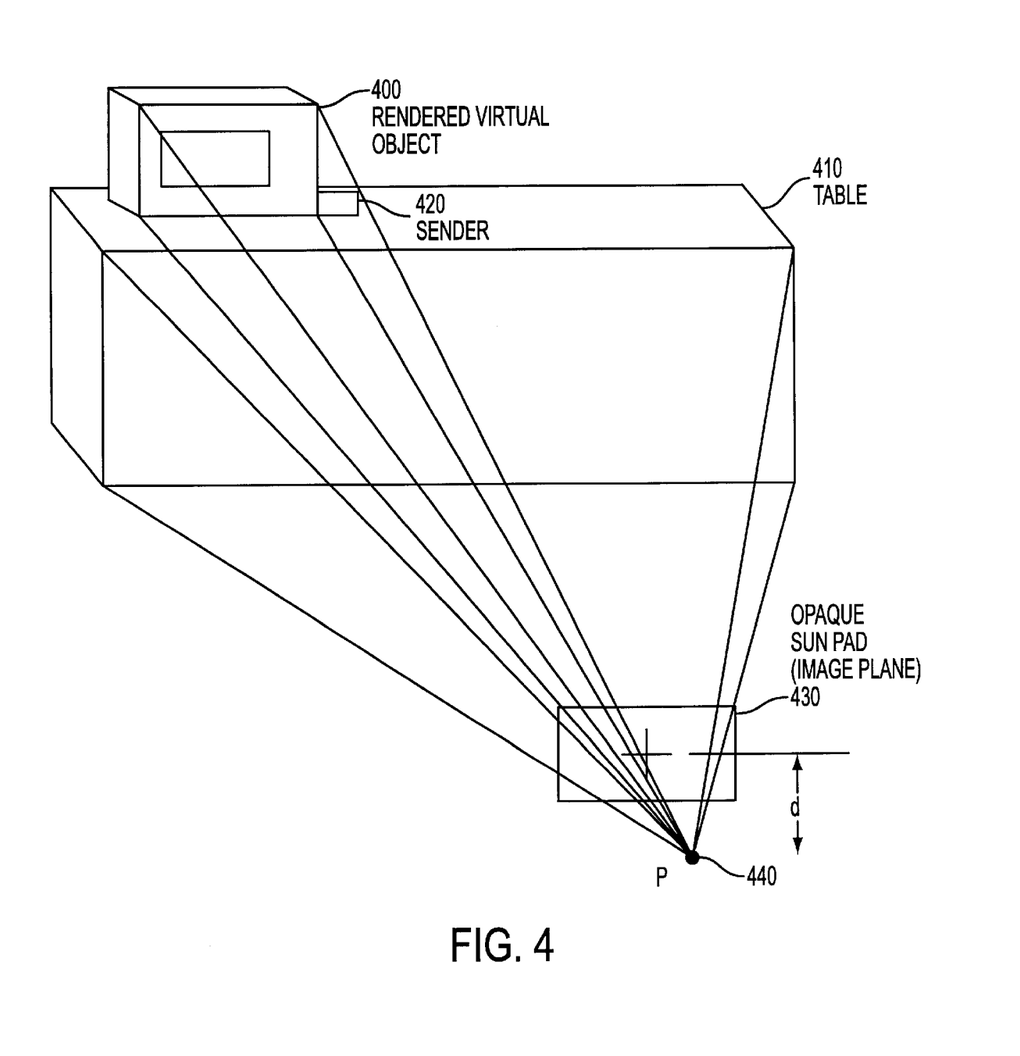
FIG. 4 illustrates a display of a virtual object displayed in the environment of its intended use in accordance with the invention.

FIG. 4 illustrates a display of a virtual microwave oven in the environment of its intended use in accordance with the invention. As the user holds up the portable computing device 430, the user's eyes are located approximately a distance D from the surface of the computing device. The display of the computing device forms the image plane upon which all images are displayed. A location sender 420 is positioned on table 410 at the location at which one wishes to see the microwave oven displayed. A rendered wire frame 400 of the microwave oven is displayed at the position indicated by the sender 420. A three dimensional wire frame is projected on to the two dimensional surface of the computing device 430 where it is superimposed over the image from the video camera which captures the environment. In this way, the rendered virtual object of a microwave oven is positioned where the user wishes it to be and where it would be positioned if it were to be purchased and installed.

The fixed telemetry receiver (260) and removable telemetry sender (250) determine the x, y, z, roll, pitch and yaw coordinates of the sender location vis-a-vis the computing device. An example of such device is the well-known Polhemus device.

A modem or receiver/transmitter device (175) is used to communicate with other computing devices. Download of three-dimensional information about the object to be displayed occurs over this link. Alternatively, it may be loaded over the disk drive. It is downloaded in a standard graphics file format such as a computer graphics metafile (CGM) and loaded into the hand held computing device. User controls, e.g. 130 and 140 allow the user to manipulate the image in a three-dimensional manner as discussed more hereinafter.

FIG. 4 illustrates conceptually how the various components of the system work together. Assume that the graphics file has been downloaded to the transparent pad. The user then places a telemetry device (420) where the virtual object is to be positioned.

To place the virtual object at the designated position, several computations must be made. First, the scale of the virtual object must be determined. Conceptually, the scaling factor is the ratio of the distance $d_1$, between the viewer's eyes and the hand held computing device, to the sum of distance $d_2$ (between the transparent pad and the desired position, and $d_1$, denoted as $$\frac{d_1}{d_1 + d_2}.$$

Figure 5:
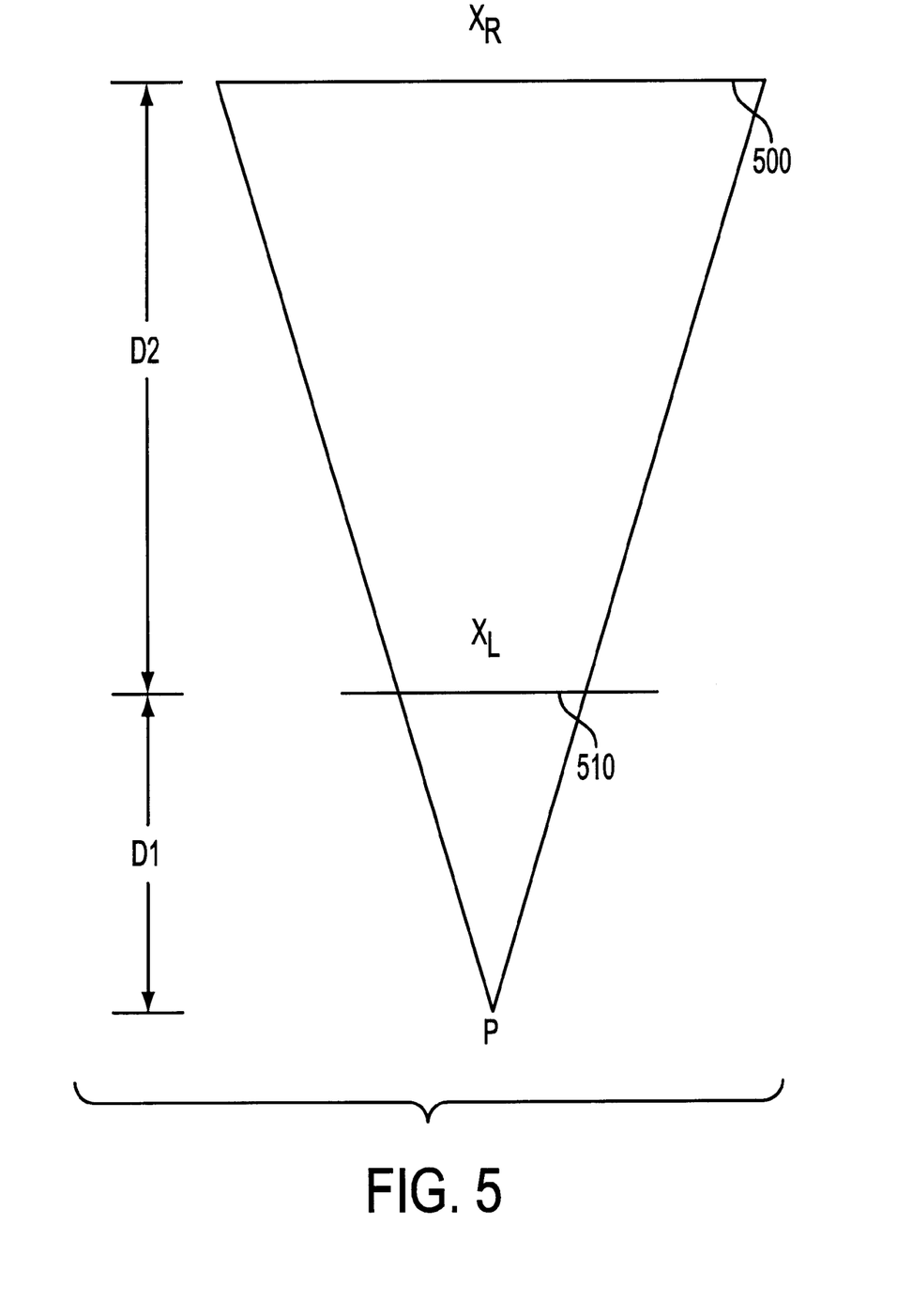
FIG. 5 illustrates geometric relationships used in scaling and locating a wire frame model.

FIG. 5 illustrates relationships between a real dimension $X_R$ and its corresponding projection, $X_L$ (410) on the display screen. A perspective point P shows the viewing point. When a three-dimensional wire frame model is downloaded, typical file formats include information about the real dimensions and the relative dimensions of the wire frame. Thus, $X_R$ represents a real dimension and $X_L$ the projected dimension on the screen. The triangle formed by base $X_L$ with respect to point P and the triangle formed by base $X_R$ with respect to point P are similar. Therefore:

$$\frac{X_L}{X_R} = \frac{d_1}{d_1 + d_2}$$

$$X_L = X_R \left( \frac{d_1}{d_1 + d_2} \right)$$

$$d_2 = \frac{X_R d_1 - X_L d_1}{X_L}$$

For example, if:
$X_L$=5.4"
$d_1$=18"
$X_R$=36"
then $$d_2 = \frac{648 - 97.2}{5.4} = 102''$$

Figure 6:
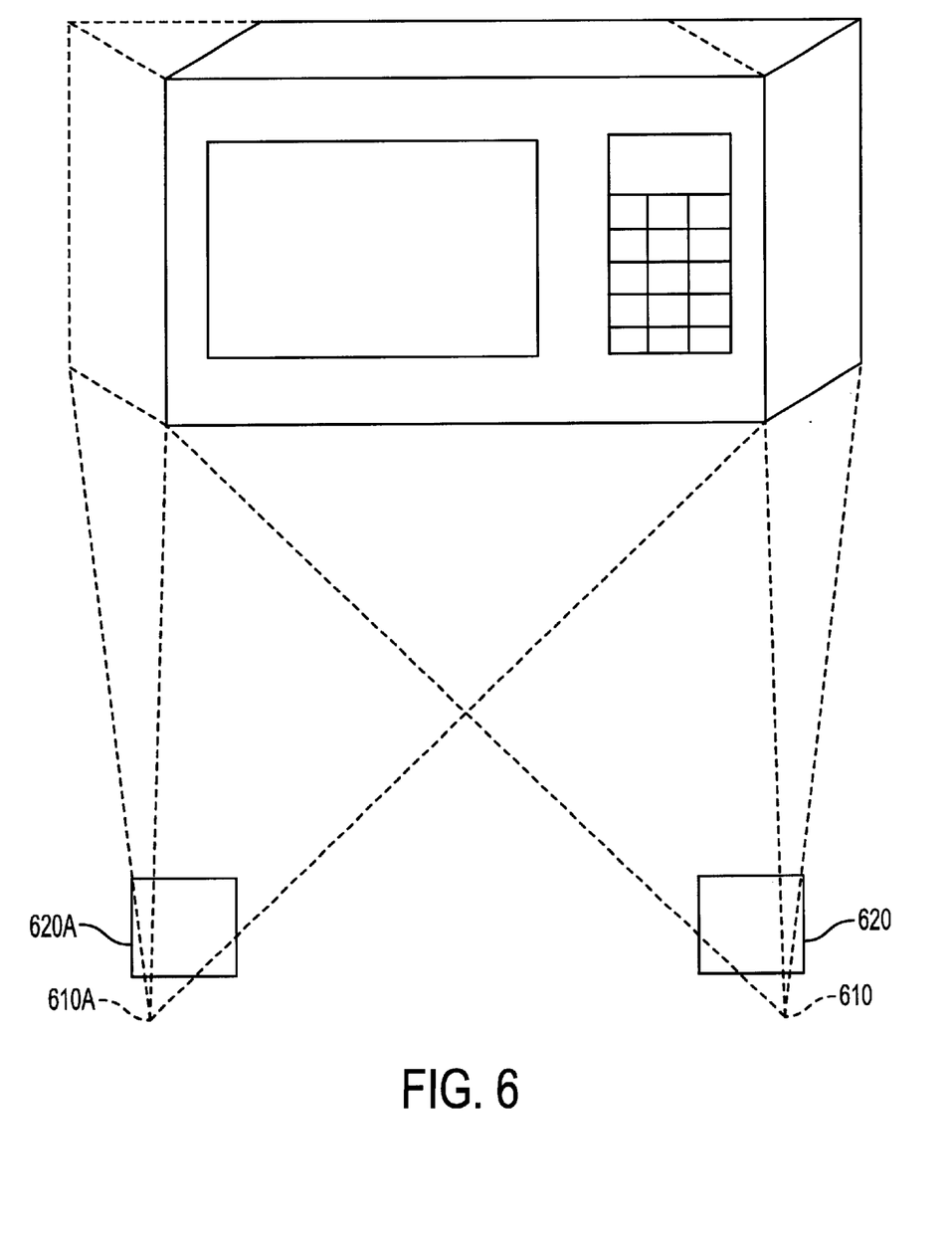
FIG. 6 illustrates how a perspective view of a fixed virtual object changes as the location of the viewer changes.

The determination of $X_L$ can be obtained from (1) the display software, (2) from screen measurement or (3) from clicking on two end points of a line, calculating the length in pixels (from the addresses of the points clicked on) and converting length in pixels to (e.g.) inches using display resolution information;

FIG. 6 illustrates how a user's view of the virtual object will change as the hand held computing device is rotated around the stationary telemetry device placed at the target destination.

Figure 7:
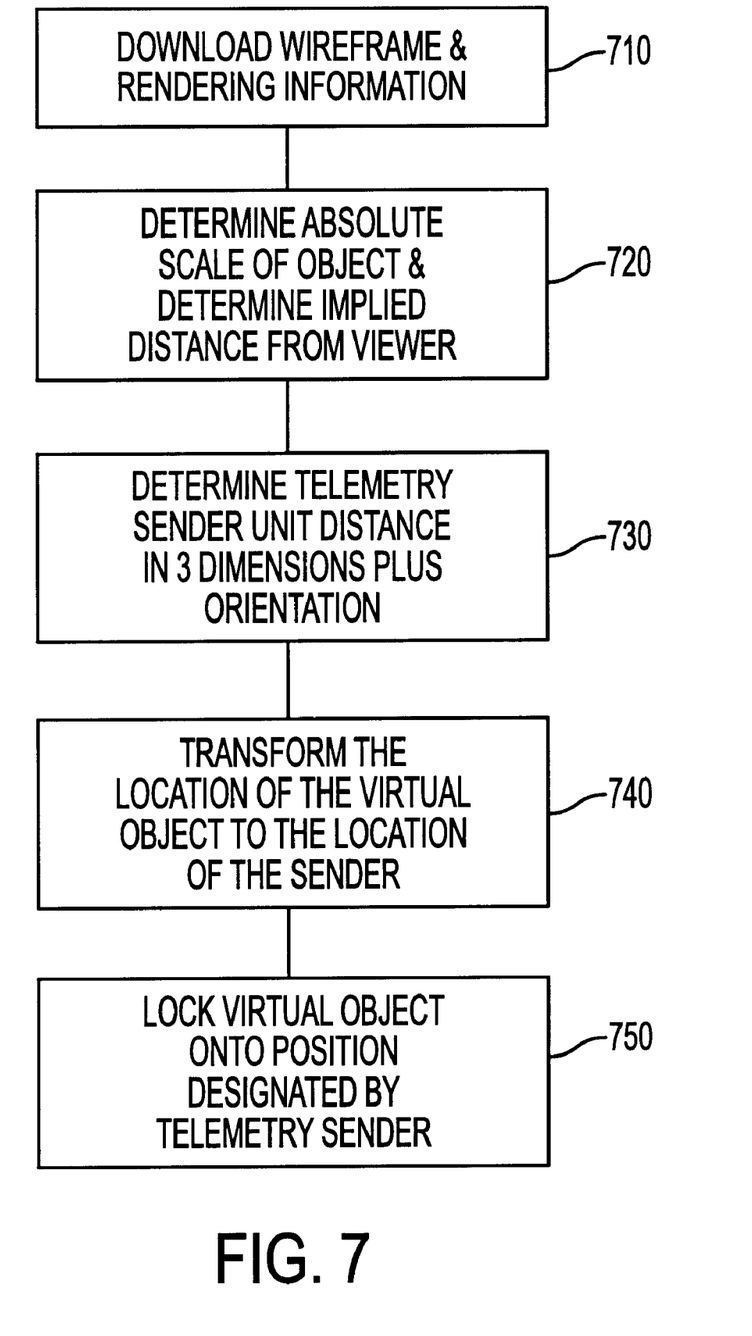
FIG. 7 is a flow chart of the computations and steps required to scale and place the virtual object at its target location.

FIG. 7 is a flow chart of the computational activities which occur to permit imaging of the virtual object. The three-dimensional wire frame with rendering information is downloaded from a source (such as the World Wide Web) in a standard graphic file format to the hand held computing device (710). Using the true physical dimensions of the object and the relative dimensions of the wire frame (all of which are included as metadata in the graphics file), one determines the scaling factor relative to the transparent pad and, in turn, the scaling factor (with implied distance $d_1+d_2$) from the shuttered glasses (720) as described above. The hand held computing device receives from the sending telemetry device located at the target destination its distance in three dimensions and orientation relative to the device (730). Using the distance information from steps 720 and 7830, transform the wire frame to the location of the sender 380 which will result in a new scaling factor so that the virtual object will scale correctly when imaged at the sending telemetry device, looking from the shuttered glasses through the transparent pad (740).

Figure 8:
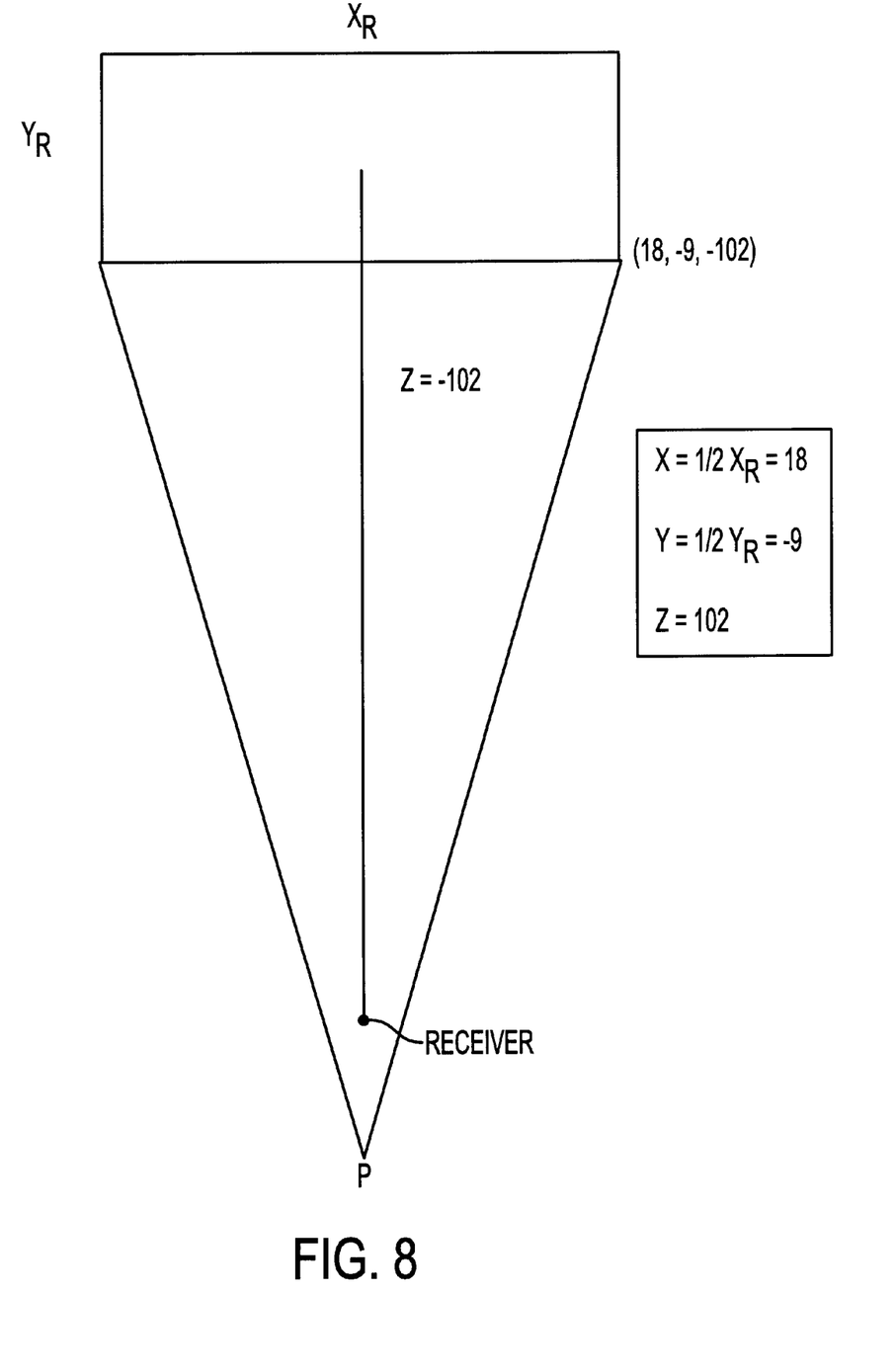
FIG. 8 illustrates locating a point on a virtual object in a coordinate system centered on the display of a computing device.
Figure 9:
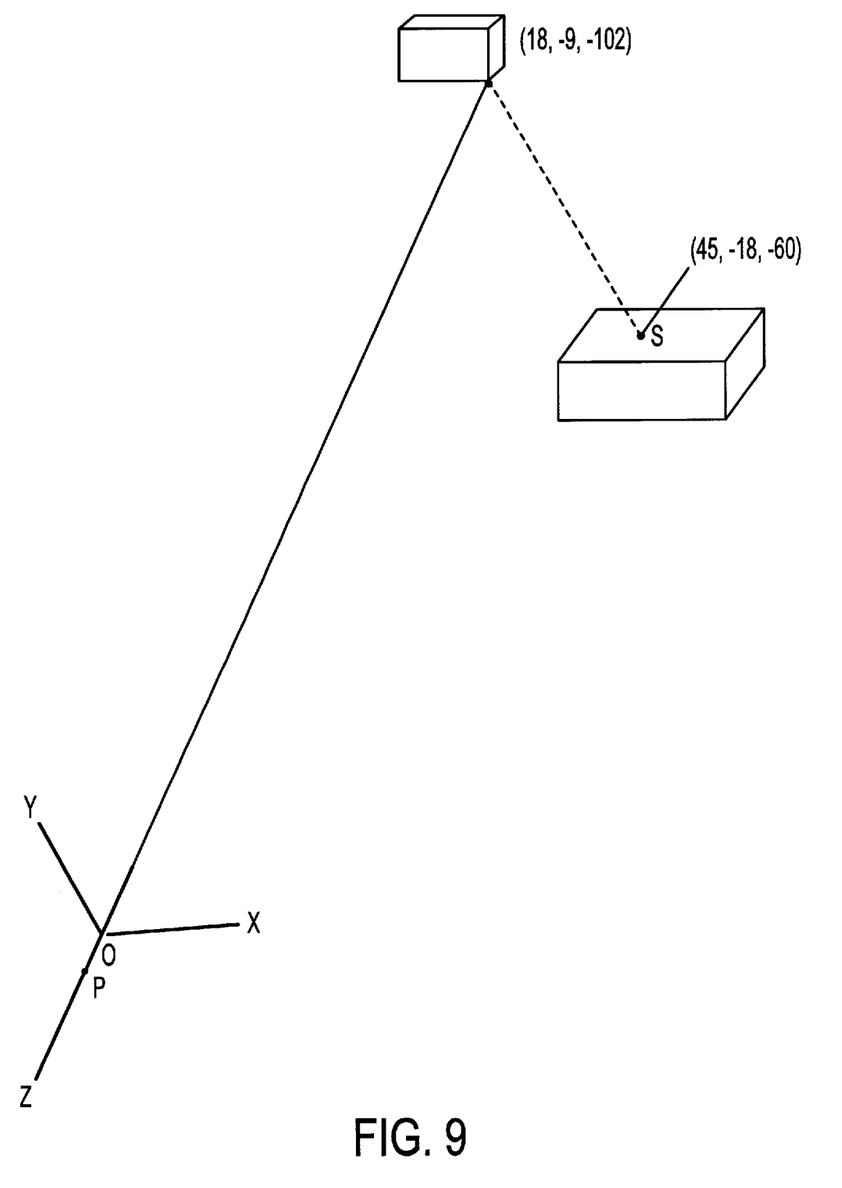
FIG. 9 illustrates positioning and locking a virtual object to a fixed point in the environment.

After being scaled, the coordinate system of the object imaged on the transparent pad must be locked (850) to the coordinate system of the target destination which has by a telemetry sender. FIGS. 8 and 9 illustrate this process.

FIG. 8 illustrates locating a point on a virtual object in a coordinate system centered on the display of a computing device. The "Z" coordinate value was determined as described in connection with FIG. 5. If the metafile representation of the wire frame is such that the object is centered in the X–Y plane on the Z axis, the X and Y coordinates of point C are at ½ $X_R$ and ½ YR respectively (see FIG. 8). Thus, the location of point "Z" is (18, –9, –102). If the virtual object is not centered, information from the metafile specifying the location and orientation can be used to identify the coordinates of point C.

FIG. 9 illustrates a portion of the process of fixing or locking the virtual object onto a desired position in the space of the environment. A telemetry sender is located at point S which with respect to the origin O of the coordinate system which is the receiver location on the hand held device. At the instant shown, point S is located at (45, –18, –60). However, the virtual object is located at (18, 9, –102) with respect to the origin 0. Standard coordinate transform techniques are utilized to relocate the point (18, –9, –102) to the point (45, –18, –60). In this case, in the X dimension, the translation from X=18 to X=45 requires a displacement of +27. Similarly, in the Y dimension, the movement from +9 to =18 requires a displacement of –27. In the Z direction, the movement from Z=102 to Z=60 requires the displacement of +42. The XYZ axes of FIG. 7 form a right hand set so that the location of the virtual object in the Z direction is actually along the –Z axis so that distance $d_2$ is a negative number.

Once the transform required to move virtual coordinate from the specified point (18, 9, –102) to (45, –18, –60) is defined, that transformation must be applied to all the other vertices of the wire frame. The software for displaying a three dimensional wire frame as a two dimensional perspective view display will scale the image of the wire frame appropriately for its new location.

Once transmitted to the sender's location, the wire frame is locked into position by continually transforming the coordinates of the wire frame vertices to be appropriately positioned within the room space as the location of the hand held device continues to move as shown in FIG. 6. Thus, a transform matrix initially defines the translation from point (18, –9, –102) to point (45, –18, –60). Once that matrix is set, as it is when a device is locked, then as the origin of the coordinate system, that is, as the receiver location moves as a hand held device relocates in the room space, the telemetry receiver receives new location information from the telemetry sender S and a new transformation matrix is calculated so as to maintain the vertices of the wire frame positioned with respect to the location of the sender at point S. Effectively, point S becomes a fixed point and the transformation matrix for the vertices of the wire frame are continually adjusted to hold the virtual object at that point by changing the elements of the transformation matrix to ensure that result.

As the receiver R moves within the room, the coordinates of the target position $S_1$, change with respect to the origin of the coordinate system at the receiver R. However, the receiver always receives the current coordinates of $S_1$, with respect to the receiver as the origin of the coordinate system. Locking the corner of the microwave oven to the room or the world coordinate systems means updating the point (18, –9, –102) of the initial object to the current value of (X, Y and Z) coordinates detected at R from the sender $S_1$. As a hand held computing device is, for example, rotated, there will come a time when a microwave oven located at the corner of the table shown is not visible in the viewing screen. It can be made viewable again by turning back toward the sender's location.

Since the receiver also detects roll, pitch and yaw information, the perspective view displayed on the screen of the three-dimensional object is always corrected for the orientation of the transparent display screen.

With a plurality of senders, a plurality of virtual objects can be virtually placed in a room, thus enabling one to virtually furnish a room when viewed through the transparent screen.

Since the fixing of one point of the three-dimensional object is insufficient to uniquely position it in three-dimensional space, rotations of the wire frame may be needed about the fixed point S (45, –18, –60), for example). Such rotations are well known in the art as part of generalized coordinate transformations. With one point fixed, rotations in two of X–Y, Y–Z. and X–Z planes about this fixed point may be required to correctly position the virtual object with respect to its environment. Typically, such rotations are accomplished under control of the up/down left/right arrow keys on the keyboard. A generalized coordinate transformation matrix includes angular components for specifying rotation as well as translational components. Thus, by adjusting the terms of the transformation matrix as the telemetry receiver moves about the room with the hand held device, a wire frame object may be virtually positioned at a location and held in position for viewing from a number of perspectives around the room.

Once the wire frame is correctly positioned, a projection of the wire frame onto the two dimensional display screen is made so that the image of the wire frame is correct for the location of the wire frame specified by the telemetry sender.

There has thus been disclosed methods, apparatus, systems and computer program products for overcoming the problems of the prior art mentioned above and which permit a ready visualization in the user's own environment of virtual objects, correctly scaled and located as they would appear in real life if they were actually in the user's environment.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for displaying a two dimensional view of a three dimensional representation of an object in the context of an environment in which the object might be placed, comprising:
    a video camera capturing a view of said environment;
    a computing device with a display; and
    at least one hardware device for measuring distance between the computing device and a location in the environment;
    in which the computing device is configured to display said two dimensional view of said object as if said object were positioned at said location together with said view of said environment.

2. Apparatus of claim 1 in which the device for measuring distance includes at least one telemetry sender and at least one telemetry receiver.

3. Apparatus of claim 1 in which the telemetry sender is removably attached to said computing device.

4. Apparatus of claim 1 in which the computing device is configured to fix said three dimensional representation at said location and to display a two dimensional view of said object.

5. Apparatus of claim 1 in which the computing device is configured to change the orientation of said three dimensional representation at said location under user control.

6. A method for displaying a two dimensional view of a three dimensional representation of an object, comprising the steps of:
    a. providing an element for performing the step of displaying a two dimensional projection of a three dimensional representation of said object;
    b. providing at least one hardware element for performing the step of determining a distance from a display of a computing device to a location in an environment at which said object should appear to be located; and
    c. providing an element for performing the step of adjusting the display of said projection so said object appears to be positioned at said location.

7. The method of claim 6 in which a video camera captures the environment in which the object might be placed and displays an image of said environment on said display with said display of said object.

8. The method of claim 6 further comprising:
    providing an element for performing the step of downloading said three dimensional representation to said computing device from another computing device.

9. The method of claim 8 in which the downloading occurs over a network.

10. A system for displaying a two dimensional view of a three dimensional representation of an object in the context of an environment in which the object might be placed, comprising:
    a source of one or more three dimensional representations of respective objects;
    a source of images of said environment;
    at least one hardware device for determining distance between a computing device and a location in said environment; and
    a computing device for displaying a two dimensional view of at least one of said three dimensional representations of an object scaled appropriately for said distance together with images of said environment.

11. A method for accessing information about items available for acquisition, comprising the steps of:
    providing an element for performing the step of retrieving a three dimensional representation of one of said items;
    providing at least one hardware element for determining distance between one of a computing element and a display and a location in said environment; and
    providing an element for performing the step of displaying at least one two dimensional perspective view of said three dimensional representation on said display scaled appropriately for said distance together with a view of said environment;
    whereby said two dimensional perspective view can be viewed in context with an environment in which said one of said items might be used.

12. A system for accessing information about items available for acquisition, comprising:
    a network;
    a first storage device containing at least one three dimensional representation of one of said items connected to said network;
    a computing device connected to said network, configured to download three dimensional representations and to display two dimensional perspective views of them; and
    at least one hardware device for measuring distance between a display screen and a location in the environment of said computing device;
    said computing device displaying a two dimensional perspective view of one of said three dimensional representations at said location with a scale determined by the distance between the display screen and said location in the environment.

13. A computer program product comprising:
    a memory medium; and
    a computer program stored on said memory medium containing
    instructions for displaying a three dimensional representation of an object with sizing and orientation appropriate to a location provided by at least one hardware device in an environment of a computer upon which said program is to be run together with an image of said environment.

* * * * *